Jan. 28, 1930.  W. D. ARCHEA  1,744,857
MILLING MACHINE
Filed Dec. 10, 1926  5 Sheets-Sheet 1
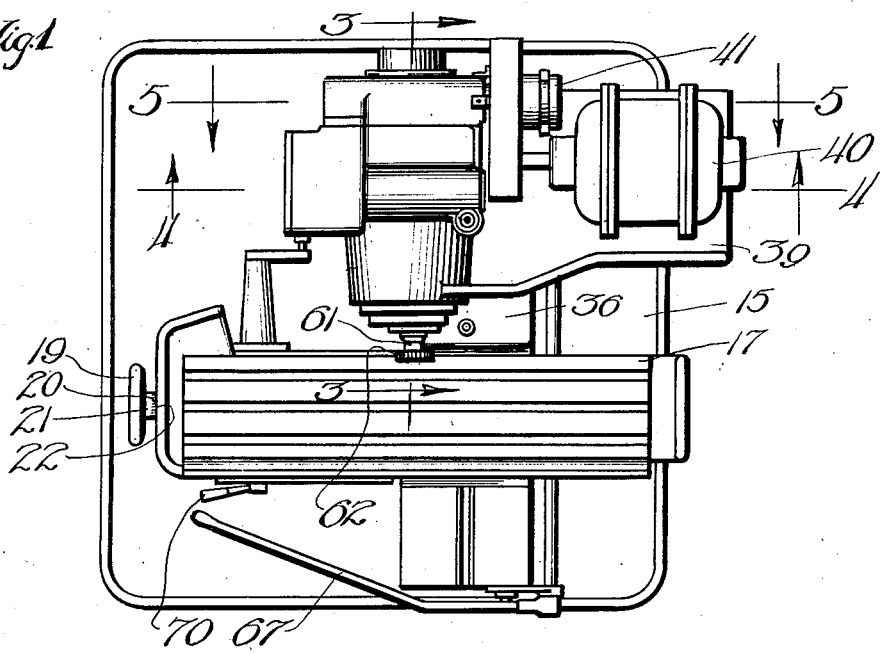
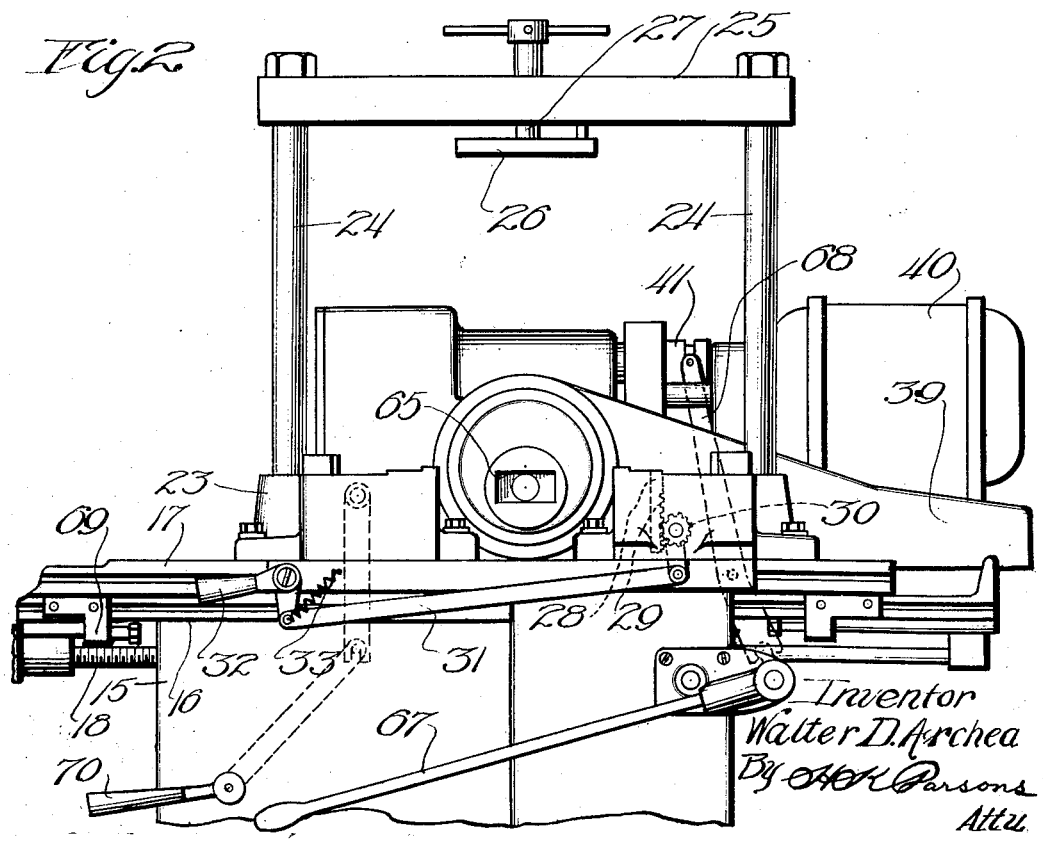
Inventor
Walter D. Archea
By Parsons
Atty.

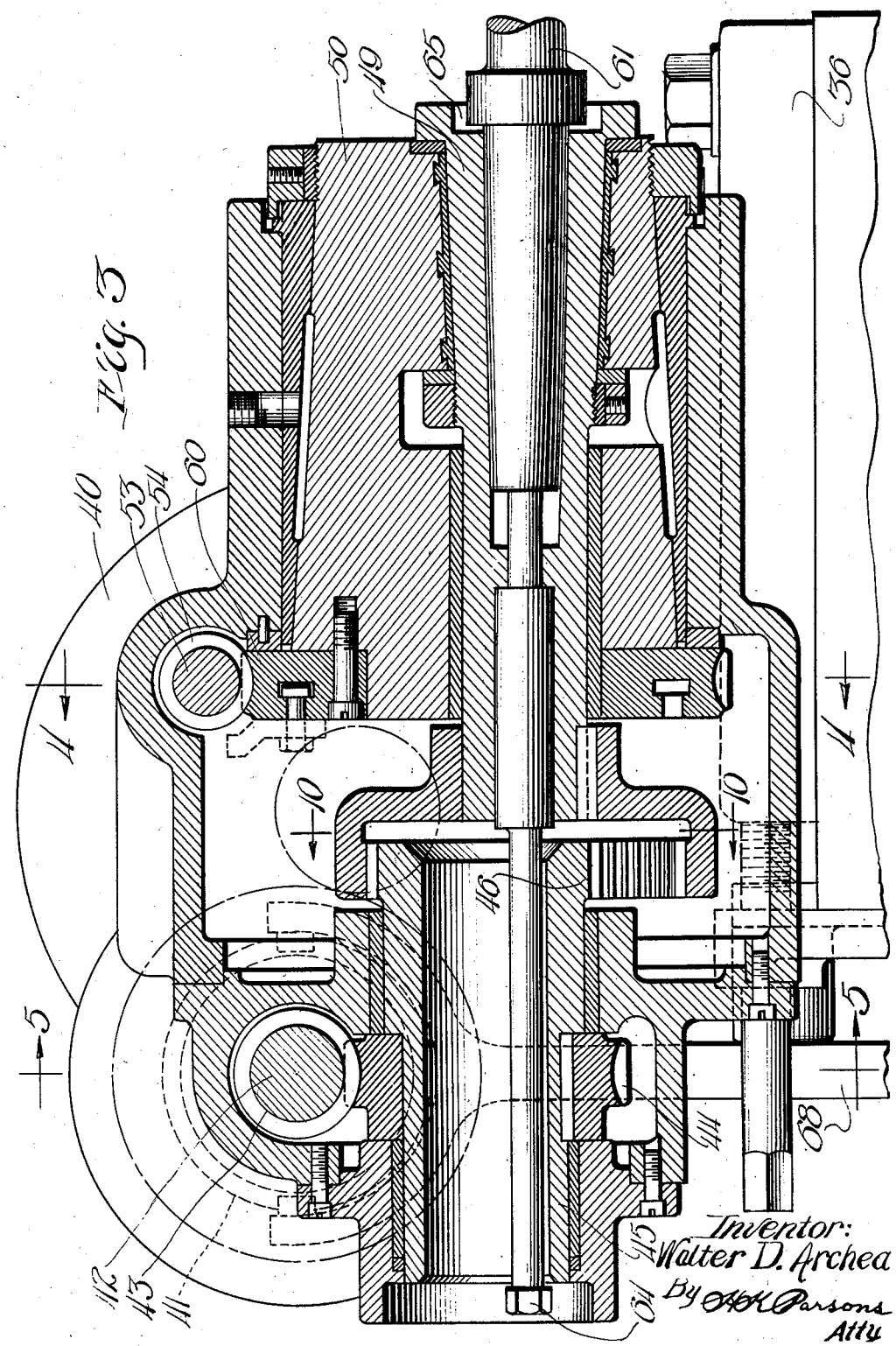

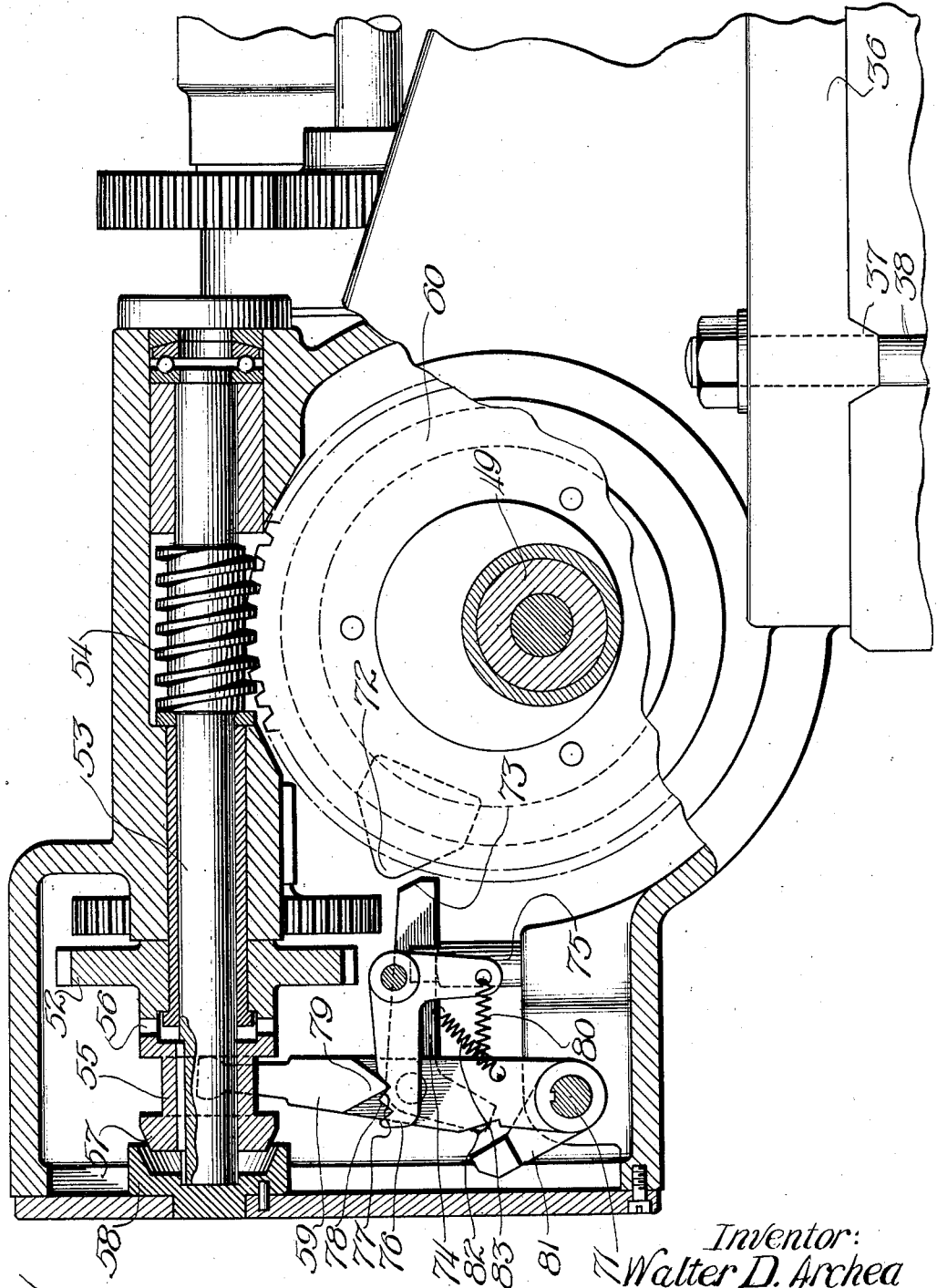

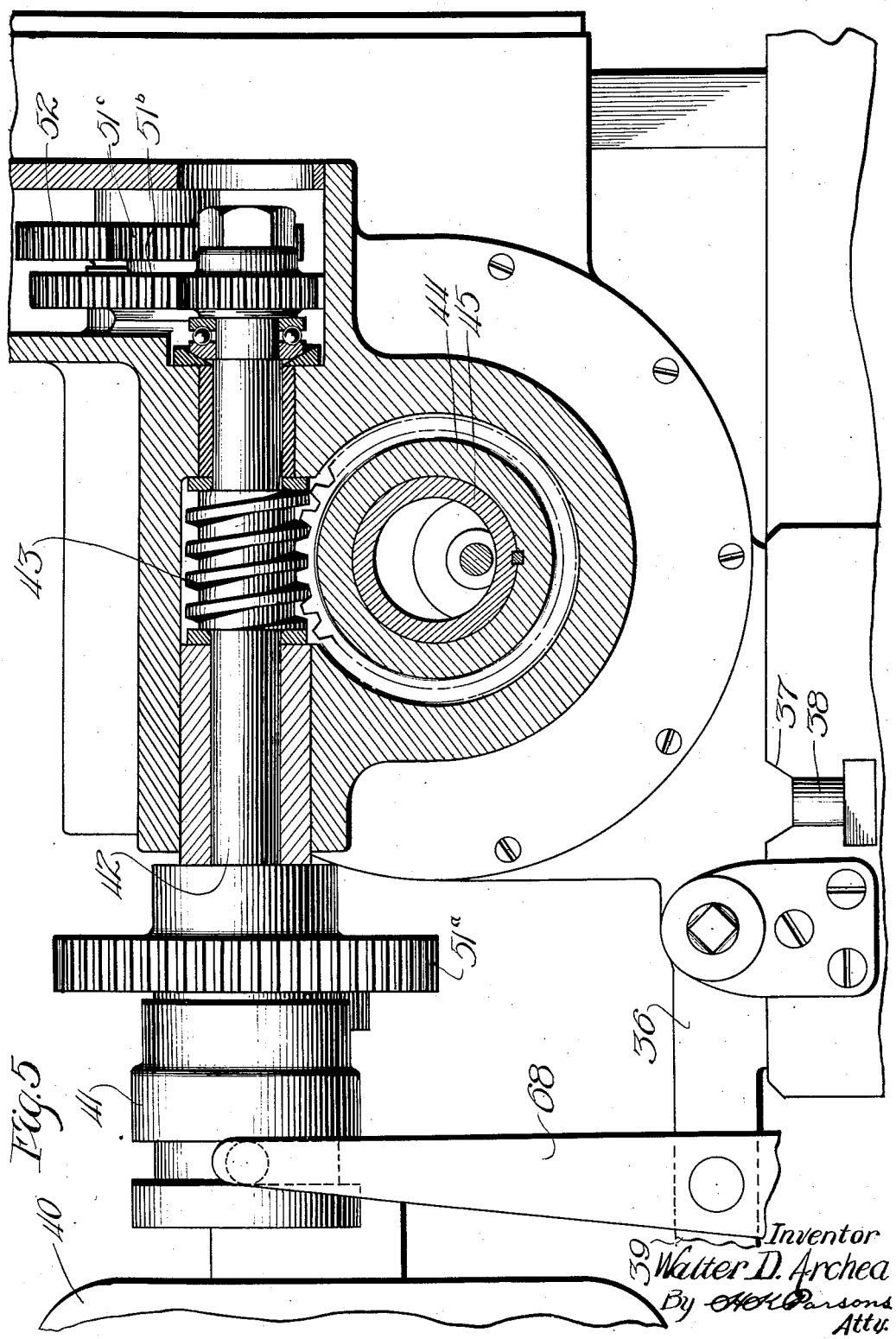

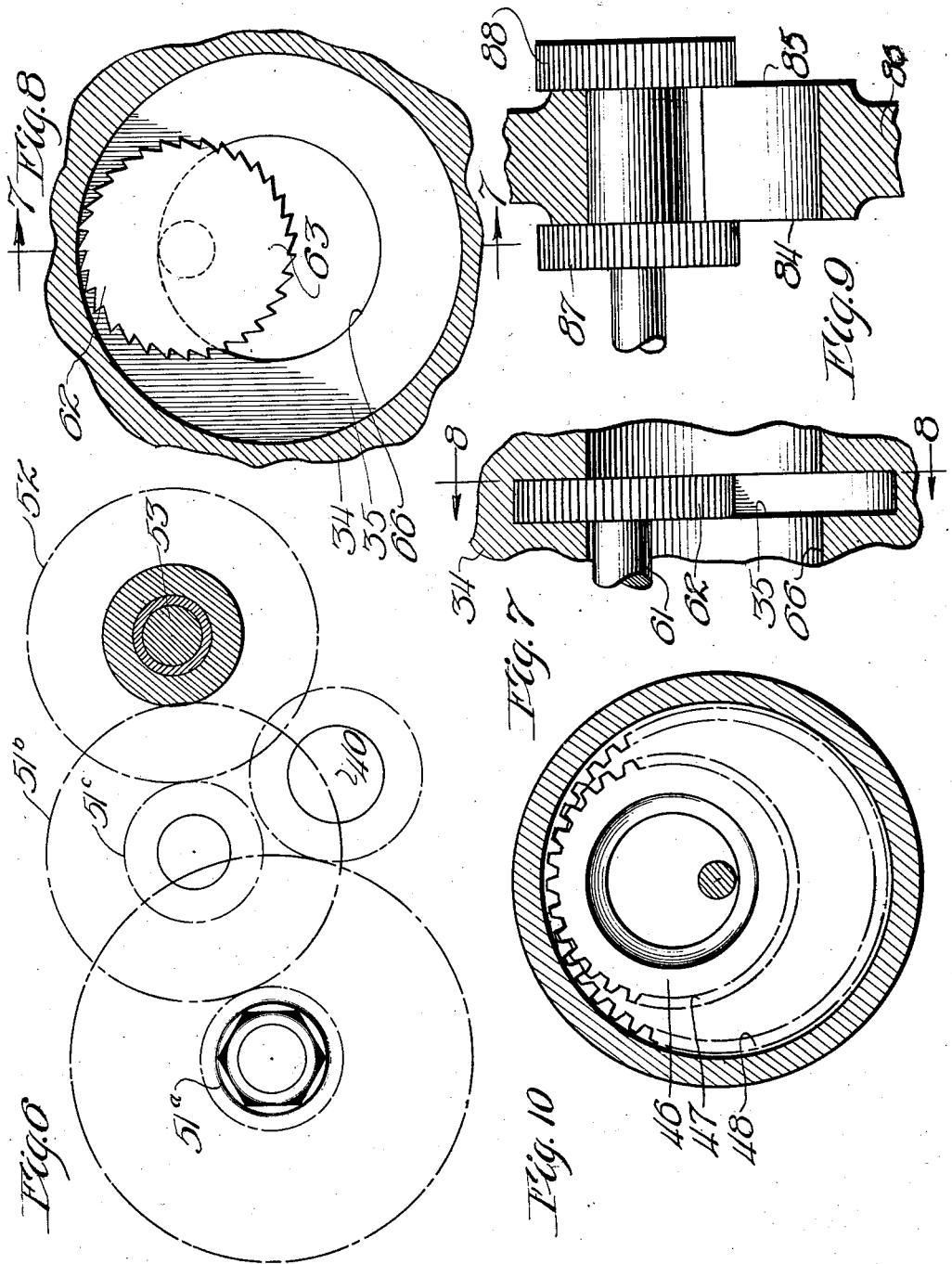

Patented Jan. 28, 1930

1,744,857

UNITED STATES PATENT OFFICE

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO

MILLING MACHINE

Application filed December 10, 1926. Serial No. 153,995.

This invention relates to improvements in milling machines and has particular reference to a special machine adapted for the formation of oil slinger grooves, the straddle milling of automobile crankcase with crankshaft bearing cap in position or other similar work.

One of the objects of the present invention is the provision of a milling machine structure particularly adapted for the formation of internal grooves or cuts interiorly of arcuate members.

A further object of the present invention is the provision of an automatic mechanism which may be satisfactorily employed for internal milling of a prescribed arc and in which cyclic operation may be effected with any desired limit as to the point of cessation of relative circular movement of work and cutter.

Another object of the present invention is the provision in connection with a milling machine having a cyclic path of cutter movement, of an improved single clutch mechanism operable automatically to limit the movement of the cutter to a single cycle.

Further objects and advantages of the present invention should be readily apparent by reference to the following specification taken in connection with the accompanying drawings and it will be understood that any modifications in the specific structural details hereinafter disclosed may be made within the scope of the appended claims, without departing from or exceeding the spirit of the invention.

Figure 1 is a plan view of a machine, constructed in accordance with the present invention.

Figure 2 is a front elevation thereof.

Figure 3 is a longitudinal section through the spindle carrier and associate parts taken as on the line 3—3 of Figure 1.

Figure 4 is a sectional view on the line 4—4 of Figure 3.

Figure 5 is a section on line 5—5 of Figure 1.

Figure 6 is an end view of the gear reduction train between the two worm shafts.

Figure 7 is a diametrical section of a work piece showing the formation of a central groove therein.

Figure 8 is a sectional view at right angles to Figure 7 as on the line 8—8 thereof.

Figure 9 is a view similar to Figure 7, illustrating an operation on the opposing faces of a crankshaft bearing or the like, and, Figure 10 is a sectional view on the line 10—10 of Figure 3.

In the drawings in which similar characters of reference are employed to denote corresponding parts throughout the several views, the numeral 15 designates the base of a milling machine having the ways 16 for a sliding table 17. This table may be moved transversely on the base as by adjusting screw 18 and hand or pilot wheel 19. Graduations 20 on collar 21 of the pilot wheel cooperate with an index 22 on the base to facilitate fine adjustment of the table.

The table serves as a support for a suitable work clamping fixture, which is illustrated as comprising a bed portion 23 resting on the table and having rising therefrom uprights 24 connected by a cross piece 25. This cross piece bears clamp 26 adjustably as by rotation of screw 27 to secure a work piece in position. The bed is provided with suitable mechanism such as the positioning pins 28 shiftable by interengagement of rack 29 and pinion 30 to raise the pins into work locating position or to depress the pins to facilitate ready removal or mounting of a work piece. Pinion 30 is controlled as through link 31 and operating handle 32 which may be swung upwardly to raise the positioning pin or pins and which is normally held in depressed position as by action of the spring 33.

The present invention is designed to make it possible to mill certain structures in which a milling operation was hitherto impossible without a multiplicity of adjustments.

For example, the present invention is intended to operate on an automobile cylinder block or like work piece 34 to form therein an oil slinger groove 35, circular in outline as shown in Figure 8, but sunk into the continuous material of the block. To produce such a groove it is impossible to utilize a large form cutter which will fit the groove as is ordinarily employed for similar purpose when the parts are accessible in such a manner to receive such a cutter. The only way in which a groove of this nature can be formed is by either employing a small cutter and moving the work in a substantially circular path relative to the cutter or by holding the work stationary and shifting the cutter in a path producing what might be termed a planetary motion for the cutter. The present invention particularly contemplates a machine for so shifting the cutter. For the accomplishment of this result the base 15 of the machine is provided with a head or column member 36 capable of forward and backward adjusting movement on the ways 37 and adapted to be secured in such adjusted position by tightening of the T bolts 38. This movable member includes a bracket portion 39 supporting the drive motor 40 for operation of the machine. This motor operates through clutch 41 to drive shaft 42 bearing worm 43 in mesh with worm gear 44, forming a part of the spindle drive transmission. This gear 44 is keyed to sleeve 45, journalled in the member 36 and has at its forward end the flange 46 cut to form teeth 47 to mesh with the internal gear 48, which is carried by the spindle 49. The spindle 49 is itself eccentrically journalled in the spindle carrier 50, which in turn is eccentrically disposed as respects the sleeve 45. The relationship of these parts however, is such that if the sleeve 45 and spindle carrier 50 be rotated at unequal speeds, the internal gear 48 and gear 47 will have a progressive rolling advancing movement in addition to the driving movement imparted from one to the other, so that the two will remain in constant driving mesh irrespective of the relative shifting of the two mechanisms in operation.

The means for imparting rotation to the spindle carrier 50 includes a change gear series 51 transmitting power from shaft 42 to gear 52, which is rotatably supported concentric with shaft 53, bearing the worm 54. A clutch spool 55 has a clutch portion 56 for interengagement with a clutch face on the gear and a braking portion 57 for engagement with the stationary brake 58, carried by the frame 36. This clutch spool is keyed to shaft 53 and is selectively shifted as by the lever 59 to couple the shaft for driving from gear 52 or for frictionally resisting movement of shaft as by interengagement of the brake members. Worm 54 meshes with gear 60, suitably secured on the spindle carrier 50 for actuation thereof as will be readily understood by reference to Figures 3 and 4.

It is to be understood that as gear 60 is rotated it shifts the spindle carrier and thus spindle 49 in a circular path eccentric to the axis of rotation of the spindle. Carried by the spindle is a suitable arbor 61 bearing the cutter 62 which will be carried with the spindle producing for example the groove 35, generating about center 63 and of considerably greater radius than that of the cutter 62 as is best shown in Figure 8. The cutter arbor 61 is suitably drawn into the spindle arbor socket as by the nut 64 and the arbor and spindle nose preferably have interlocking parts as indicated at 65, securing them against relative rotation.

In the operation of the machine to form an oil slinger groove such as shown at 35 for example, the machine is rendered inoperative by disengaging clutch 41 and with the cutter arbor 61 preferably at a point 90° from the vertical and at the left as you face the machine. With the parts in this position the table is shifted by the pilot wheel 19 to align the center of the fixture with the cutter and the work piece moved into position in the fixture with the cutter received in the aperture 66. Lever 67 at the front of the machine is then rocked to actuate clutch control lever 68 and move clutch 41 into operative position, so that power is applied to shaft 42. This application of power through the intermeshing of gears 47 and 48 will rotate the spindle and its cutter 62. At this time clutch spool 55 is in position to hold spindle carrier 50 stationary and disconnect from its power drive. The table is now shifted to bring the work into the cutter laterally to an amount which may be determined for example by the adjustable stop 69 on the table, adapted to contact with the bed or base 15, giving the proper depth of cut. This likewise may if desired be checked or determined by the dial and indicator mechanism 21—22. When the table has been moved in the requisite amount for the depth of cut to be performed the cutter will have eaten into the work at this particular point. Controlling handle 70 is then shifted to rock shaft 71 which bears clutch control lever 59 moving the clutch into operative engagement with gear 52 for actuation of worm 54. The spindle carrier will then rotate, the cutter continuing to be driven and the desired groove formed. It will be understood that in some instances only a semicircular groove is desired as in a split bearing or the like or other limits may be prescribed.

In order that the cycle of movement may be automatically controlled, use is preferably made of a single revolution-semi-revolution or like control mechanism. This may comprise a knockout lug 72 or a plurality of such lugs secured at appropriate points about the periphery of gear 60. This knockout is positioned to engage the inclined end 73 of bell crank lever 74 which is pivoted to lever 59. Intermediately the member 74 is slidably supported by the slotted post 75 which limits its downward swinging movement while permitting of free upward swinging thereof. Consequently, as the knockout 72 comes into engagement with the inclined surface 73 it will cam or force member 74 to the left as viewed in Figure 4. This action will correspondingly shift lever 59, tending to disengage clutch 56. To accentuate the disengaging action and snap the clutch from its disengaging position to a braking position, use may be made of the notched detent 76 having notches 77 and 78 for engagement with wedge 79 on lever 59. The relationship of these parts is such that at a predetermined point in the movement of lever 59 as caused by the knockout the point 79 will move from its engagement in notch 77 to a position within the confines of notch 78 when the tension of actuating spring 80 for the detent will be sufficient to forcibly complete the shifting of clutch spool 55. It will thus be seen that dependent on the position of the knockout the bodily circular movement of the cutter and its spindle will be automatically checked at predetermined position or positions.

To make it possible to manually inaugurate a continued movement, use is made of the rock arm 81 keyed on shaft 71. This arm is normally in the position indicated in Figure 4, but may be swung inward to engage the lower end 82 of the bell crank 74, thus rocking portion 73 of the arm upwardly against the action of spring 83. Such rocking will raise the arm to a position where it will freely slide by knockout 72 allowing lever 59 to be shifted in a clockwise manner. The continued movement of shaft 71 will cause arm 81 to contact with lever 59, swinging the lever over to the position shown in Figure 4, aided by the action of the spring pressed detent 76 as point 79 moves into notch 77. The parts will then be reset and remain in interengaged or driving relation until subsequent operation of the knockout mechanism.

It will of course be apparent that it is necessary for the spindle carrier to rotate at a quite slow rate of speed, inasmuch as the feed of the cutter into the work is entirely dependent on the rate of movement of the carrier. This reduction is therefore attained both through the use of the worm and through the use of the series of gears 51ᵃ, 51ᵇ, 51ᶜ, 52, for example, as indicated in Figures 5 and 6.

It will also be understood that while the invention has been primarily described for use in the forming of central grooves of either inclosed or open cylindrical bearings or the like, that it is also capable of application as shown in Figure 9, to surface simultaneously the opposite faces 84 and 85, of a crankshaft bearing 86 and of the bearing cap, the latter being assembled into position on the crankcase, through the use of the pair of spaced cutters 87 and 88 or for other purpose in which a combined effect of an axially rotatable and bodily movable cutter member is desired.

I claim:—

1. In a mechanism of the character described, the combination with a bodily rotatable carrier having an eccentric spindle bearing, of means for rotating the carrier, a control clutch therefor, a knockout movable with the carrier, a latch member engageable by the knockout to shift the clutch into inoperative position, manual means for reengaging the clutch, and means operative on initial actuation of the manual means for shifting the latch out of engagement with the knockout.

2. In a mechanism of the character described, the combination with a bodily rotatable carrier having an eccentric spindle bearing, of means for rotating the carrier, a control clutch therefor, a knockout movable with the carrier, a latch member engageable by the knockout to shift the clutch into inoperative position, manual means for reengaging the clutch, means operative on initial actuation of the manual means for shifting the latch out of engagement with the knockout, and means for automatically restoring the latch to the path of movement of the knockout for subsequent actuation thereby.

3. A mechanism of the character described, including a work support and a cutter, means for imparting both rotation and bodily movement in a rotary path to the cutter, a common power drive for both of said means, a clutch for disconnecting the power drive from the entire mechanism and a second clutch member for disconnecting the power drive from one of the cutter actuating members.

4. A mechanism of the character described, including a work support and a cutter, means for imparting both rotation and bodily movement in a rotary path to the cutter, a common power drive for both of said means, a clutch for disconnecting the power drive from the entire mechanism, a second clutch member for disconnecting the power drive from one of the cutter actuating members, means for manually rendering one of said clutches inoperative and additional means for automatically rendering the other of said clutches inoperative.

5. In a machine of the charatcer described, the combination with a work support and a cutter, of means for imparting both axial rotation and orbital shifting movements to the cutter, drive mechanism for effecting both of said movements, including a pair of drive shafts, a prime mover, a clutch intermediate the prime mover and one of said shafts, a clutch intermediate the two shafts adapted to connect the shafts for joint power actuation, and means for varying the operative position of the clutches.

6. A machine of the character described, including a work support and a cutter, means for imparting rotary movement to the cutter about its axis, means for bodily shifting said cutter in a circular path, a drive shaft for supplying rotary movement to the cutter, a second shaft driven by the first for imparting bodily movement to the cutter, and means for varying the relative speeds of said shafts.

7. A machine of the character described, including a work support and a cutter, means for imparting rotary movement to the cutter about its axis, means for bodily shifting said cutter in a circular path, a drive shaft for supplying rotary movement to the cutter, a second shaft driven by the first for imparting bodily movement to the cutter, means for varying the relative speeds of said shafts, and additional means for breaking the power connection between said shafts.

8. A machine for the production of annular grooves or the like, including a work holder and a cutter head, a sleeve rotatably mounted in the cutter head and having a gear portion formed thereon, a spindle carrier rotatably mounted in the head concentric with the sleeve, said carrier having an eccentric bore formed therein, a spindle journaled in the bore and having a portion projecting adjacent the sleeve, said projecting portion bearing an internal gear of diameter to mesh with the gear on the sleeve at any orbital adjustment of the spindle, a worm gear on the sleeve, a worm gear on the spindle carrier, means for driving the worm gear on the sleeve to rotate the spindle at a high rate of speed, an interruptable gear train leading from the sleeve driving means and terminating in a worm meshing with the worm gear on the carrier, whereby the carrier may be driven when the spindle is actuated and a clutch member for interrupting the drive of the carrier independent of the operation of the spindle, substantially as and for the purpose described.

9. In a machine of the character described, the combination with a spindle shiftable in an orbital path, of means for controlling the shifting of the spindle including a power drive therefor and a clutch for controlling said power drive, a clutch shift lever, a bell crank pivoted thereto and movable therewith, a post member adjacent the lever and having a slotted portion forming a guide for the bell crank, a knock-out associated with the spindle and adapted on orbital movement of the spindle to engage the bell crank and shift the lever and associated clutch into inoperative position, and means for reengaging the clutch including a rock shaft and an arm carried by the rock shaft having portions for successively engaging the bell crank to lift same out of the path of the knockout and for engaging the clutch shaft lever to subsequently actuate said lever.

In testimony whereof I affix my signature.

WALTER D. ARCHEA.